Sept. 28, 1954      A. KAGAN      2,690,160

DROP DELIVERING POULTRY FONT

Filed Aug. 20, 1951

INVENTOR.
Al Kagan
BY
Wilfred F. Lawson
ATTORNEY

Patented Sept. 28, 1954

2,690,160

UNITED STATES PATENT OFFICE 2,690,160

DROP DELIVERING POULTRY FONT

Al Kagan, Los Angeles, Calif.

Application August 20, 1951, Serial No. 242,633

1 Claim. (Cl. 119—72.5)

This invention relates to a drinking font for poultry and it is primarily an object of the invention to provide a device of this kind wherein the outflow of water is normally prevented but readily started by the beak of a fowl.

The invention consists in the details of construction and in the combination and arrangement of the several parts of my improved drinking font for poultry whereby certain advantages are attained, as will be hereinafter more fully set forth.

In order that my invention may be better understood, I will now proceed to describe the same with reference to the accompanying drawings, wherein.

Figure 1:
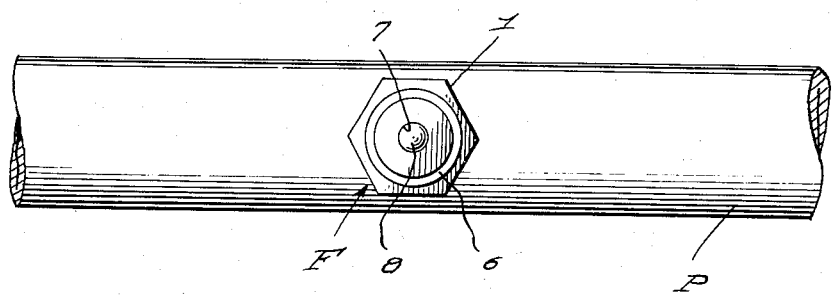
Figure 1 is a view in top plan of a font constructed in accordance with an embodiment of the invention and in applied position upon a water pipe, a portion of which pipe is shown.
Figure 2:
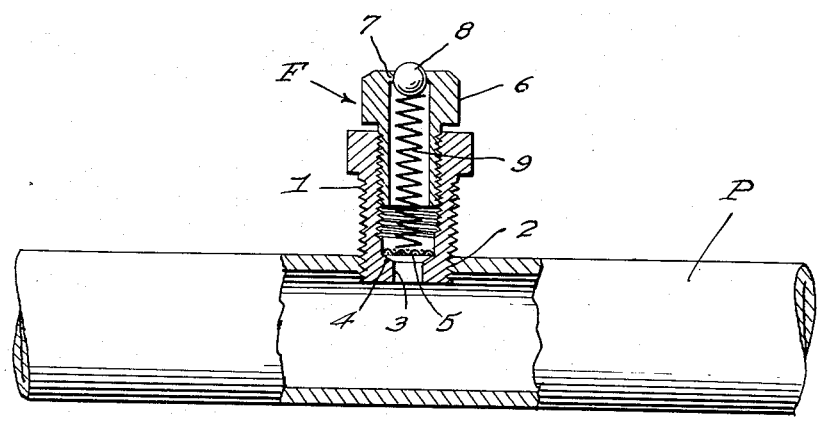
Figure 2 is a view of the device in vertical section, with a part of the pipe in section and partly in elevation.
Figure 3:
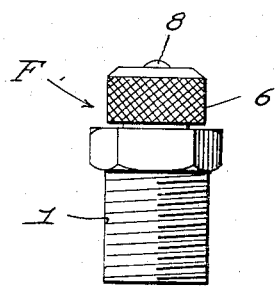
Figure 3 is a view in side elevation of the font as herein embodied unapplied.

As disclosed in the accompanying drawings, P denotes a pipe line leading from a suitable source of water and at desired locations along the pipe are fonts constructed in accordance with an embodiment of the invention.

As herein comprised the font F includes a nipple 1 which threads through an opening 2 in the wall of the pipe P for communication with the interior of the pipe P. The bore 3 of the nipple 1 at the receiving or ingress end portion thereof is reduced in diameter to provide an inwardly facing annular shoulder 4 with which engages the peripheral portion of a filter disk 5, such as a fine meshed plate.

Threading into the opposite or outer portion of the bore 3 of the nipple 1 is a sleeve 6 opening at both ends and having its outer extremity provided with a surrounding inturned lip 7 providing an inwardly facing valve seat which normally engages a ball valve member 8.

The valve member 8 is maintained normally seated by the expansible member 9 herein disclosed as a coil spring, and which is interposed between the filter disk 5 and the ball valve member 8.

As hereinbefore stated, the valve member 8 is normally closed but a fowl desiring water need only to strike with its beak the member 8 to move the same from its seat or lip 7.

The font F in practice is disposed upwardly and preferably in a substantially vertical position and by adjusting the sleeve 6 endwise with respect to the nipple 1, the tension of the member or spring 9 may be regulated as desired within certain limitations.

From the foregoing description it is thought to be obvious that a drinking font for poultry constructed in accordance with my invention is particularly well adapted for use by reason of the convenience and facility with which it may be assembled and operated.

I claim:

In a poultry font, a nipple threaded in an opening in the top side of a water supply pipe line, the inner end of the bore of the nipple being of a reduced diameter to provide an annular shoulder encircling a restricted exit opening for the water from the pipe line, a sleeve threaded inwardly of the outer end of the bore and having the outer end of its bore also of a reduced diameter to provide an inwardly facing valve seat, a valve element within the bore of said sleeve, and a coil spring also within the bore of said sleeve and having its inner end resting on said shoulder and its outer end supporting said valve element and urging it into engagement with the valve seat.

References Cited in the file of this patent

UNITED STATES PATENTS

| Number | Name | Date |
|---|---|---|
| 1,165,673 | Holmes | Dec. 28, 1915 |
| 1,443,675 | Bowler | Jan. 30, 1923 |
| 1,912,530 | Kubler | June 6, 1933 |
| 2,307,220 | Hewitt | Jan. 5, 1943 |

FOREIGN PATENTS

| Number | Country | Date |
|---|---|---|
| 26,012 | Australia | Dec. 29, 1930 |